(12) United States Patent
Papillon et al.

(10) Patent No.: US 9,571,999 B2
(45) Date of Patent: Feb. 14, 2017

(54) CONDITIONAL INTERACTION CONTROL FOR A VIRTUAL OBJECT

(71) Applicant: Alcatel Lucent, Boulogne Billancourt (FR)

(72) Inventors: Serge Papillon, Nozay (FR); Antony Martin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 16 days.

(21) Appl. No.: 14/414,927

(22) PCT Filed: Jun. 12, 2013

(86) PCT No.: PCT/EP2013/062103
§ 371 (c)(1),
(2) Date: Jan. 15, 2015

(87) PCT Pub. No.: WO2014/012717
PCT Pub. Date: Jan. 23, 2014

(65) Prior Publication Data
US 2015/0141057 A1 May 21, 2015

(30) Foreign Application Priority Data
Jul. 17, 2012 (EP) .................................... 12305867

(51) Int. Cl.
*H04W 4/20* (2009.01)
*H04W 4/00* (2009.01)
(Continued)

(52) U.S. Cl.
CPC ................ *H04W 4/20* (2013.01); *G06F 3/017* (2013.01); *H04L 67/38* (2013.01); *H04W 4/005* (2013.01);
(Continued)

(58) Field of Classification Search
CPC ...... H04W 4/005; H04W 4/023; H04W 4/027; H04W 4/04; H04W 4/20
(Continued)

(56) References Cited

U.S. PATENT DOCUMENTS 7,068,189 B2  6/2006 Brescia
2009/0017799 A1  1/2009 Thorn
(Continued)

FOREIGN PATENT DOCUMENTS

JP    2003-032721      1/2003
WO    WO 02/059716 A2  8/2002
WO    WO 2009/085399 A1 7/2009

OTHER PUBLICATIONS

International Search Report for PCT/EP2013/062103 dated Aug. 2, 2013.

*Primary Examiner* — Sam Bhattacharya
(74) *Attorney, Agent, or Firm* — Fay Sharpe, LLP

(57) ABSTRACT

A method and system for providing conditional interaction for a virtual object (2) accessible with a mobile device (1), said mobile device (1) comprising geolocation means for assessing a real-world geographic location (PI) to said mobile device (1), and said virtual object (2) being assessed a location information (P2) corresponding to a real-world geographic location, In various embodiments at least one interaction is conditioned with said virtual object (2) through said mobile device (1), at least in function of the real-world geographic location (PI) of said mobile device (1) and the location information (P2) of said virtual object (2). In case said conditioning step is satisfied, interacting (7) with said mobile device (1) on said virtual object by modifying said location information (P2) of the virtual object (2).

17 Claims, 5 Drawing Sheets

(51) Int. Cl.
  *H04W 4/02* (2009.01)
  *H04W 4/04* (2009.01)
  *H04W 4/18* (2009.01)
  *H04L 29/06* (2006.01)
  *G06F 3/01* (2006.01)

(52) U.S. Cl.
  CPC ............... *H04W 4/02* (2013.01); *H04W 4/023* (2013.01); *H04W 4/027* (2013.01); *H04W 4/04* (2013.01); *H04W 4/043* (2013.01); *H04W 4/185* (2013.01); *H04W 4/206* (2013.01)

(58) Field of Classification Search
  USPC ..................... 455/456.1, 456.3, 456.5, 456.6
  See application file for complete search history.

(56) References Cited

U.S. PATENT DOCUMENTS

| | | |
|---|---|---|
| 2010/0302143 A1 | 12/2010 | Spivack |
| 2011/0191823 A1 | 8/2011 | Huibers |
| 2011/0201362 A1 | 8/2011 | Bregman-Amitai et al. |
| 2011/0238755 A1 | 9/2011 | Khan et al. |
| 2012/0025976 A1 | 2/2012 | Richey et al. |

CONDITIONAL INTERACTION CONTROL FOR A VIRTUAL OBJECT

TECHNICAL FIELD

The present invention relates generally to the field of virtual objects, and, more particularly, to a method and a system for providing conditional interactions control for a virtual object accessible with a mobile device.

BACKGROUND

A virtual object is an Information Technology (IT) object with information stored somewhere as for example in the memory of an application platform accessible with a user device trough a network.

Said virtual object comprises a location information corresponding to a real-world geographical location and rules defined for interacting with the real world. Said location and rules attached with the virtual objet give to the virtual object a presence in the real world which can be unveiled by the use of an end user device such as a mobile phone using a wide variety of technology, such as augmented reality.

Unfortunately, virtual objects and their functional interaction control are difficult to manage. Furthermore, available interactions related to already known virtual object are limited. In particular, a user may only be allowed to play or eventually add content related to a virtual object, such as a video attached to a virtual object positioned at a predefined location.

Virtual objects represent a great opportunity for interactions between people and their environment in the enterprise as well as in the public domain. There is thus a need for a method and system offering richer interactions with virtual objects.

SUMMARY

In order to address the shortcomings of the present state of the art, various embodiments provide a method for providing conditional interactions for a virtual object accessible with a mobile device, said mobile device comprising geolocation means for assessing a real-world geographic location to said mobile device, and said virtual object being assessed a location information corresponding to a real-world geographic location, said method comprising the steps of:
  conditioning at least one interaction with said virtual object through said mobile device, at least in function of the real-world geographic location of said mobile device and the location information of said virtual object;
  in case said conditioning step is satisfied, interacting with said mobile device on said virtual object by modifying said location information of the virtual object.

Such a solution combines information from the real world and virtual objects properties to dynamically propose new interactions. In particular, the analysis of the location of the mobile device and the location of the virtual object enables interacting with said virtual object when the mobile device is in a predefined geographical area around said virtual object.

Interacting with said virtual object may also be conditioned to supplemental requirements such as authentication of the user of said mobile device, or other information such as time.

While having access to said virtual object, the possibility for the user of said mobile device to modify the location information of the virtual object leads to various possible interactions as described hereafter.

Such conditional interacting based at least on location and such possibility of modifying the location information of the virtual object through said mobile device provides dynamic circumstanced interactions with said virtual object.

According to various embodiments, available interactions may be dynamically changed over conditions such as location of the virtual object, time of the day, identity of the user.

The capability of mobile devices, like smartphones, of being transported everywhere, and having geolocation data, enables the interactions between the user mobile device and the virtual object accessible with said user device to be circumstanced to the location of the user mobile device. Through the mobile device, the user may modify the location of the virtual object in different ways as explained hereafter, what offers various possible interactions with said virtual object.

In one aspect, modifying with said mobile device said location information of the virtual object, comprises making said location information of said virtual object dependent of information associated with another object.

According to particular embodiments, said another object is said mobile device and said location information of the virtual object is made dependent of the location of said mobile device.

According to various embodiments, said another object is another mobile device provided with geolocation means and said location information of the virtual object is made dependent of the location of said another mobile device.

According to other embodiments, said another object is another virtual or real object and said location information of the virtual or real object is made dependent of the location of said other virtual or real object.

According to other embodiments, said another object is a computed model provided with dynamic digital information, preferably related to real-world information, and also provided with the location information of the virtual object to dynamically calculate the location of the virtual object subjected to said computed model.

According to other embodiments, the virtual object is provided with at least one supplemental interaction attached with said virtual object, and at least one condition for triggering said at least one supplemental interaction.

In one aspect, said at least one supplemental interaction attached with the virtual object changes under at least one condition such as time.

According to various embodiments, said at least one condition for triggering said at least one supplemental interaction is that at least one another mobile device is present in a common geographical area.

According to various embodiments, said at least one condition for triggering said at least one supplemental interaction is that at least one another virtual object, assessed with a location information, is present with said virtual object in a common geographical area.

According to a particular embodiment, the mobile device is provided with an acceleration sensor and the step of modifying said location information of the virtual object, comprises:
  attaching the location of the virtual object to the one of the mobile device;
  applying to the mobile device an accelerated movement;
  measuring said acceleration with said acceleration sensor;

calculating a new location for the virtual object in function of said measured acceleration;
and said another object, for which the location information of said virtual object is made dependent from, is selected according to the new calculated location of said virtual object and the location of said another object.

In one aspect, said virtual object is provided with a type of location selected between three types of location:

a first type, named fixe type, corresponding to a fixe geographical location independent of other objects;

a second type, named embedded type, corresponding to a location dependent from the location of said mobile device, a third type, named computed type, corresponding to a location dependent from a computed location of another object or corresponding to a location calculated on the basis of a computed model;

and said at least one condition for triggering said at least one supplemental interaction attached to the virtual object, comprises verifying that the type of location attached with the virtual object is compatible with said at least one supplemental interaction.

Various embodiments also provide a system for providing conditional interactions for a virtual object accessible with a mobile device provided with geolocation means for assessing a real-world geographic location (P1) to said mobile device, said virtual object being assessed a location information corresponding to a real-world geographic location:

said system including an application platform which comprises:

means for collecting and computing information related to said virtual object which comprise at least the location information of said virtual object, and information related to the mobile device which comprise at least the real-world geographic location of said mobile device;

means for conditioning interacting with said virtual object through said mobile device, at least in function of the real-world geographic location of said mobile device and the location information of said virtual object; and means for interacting with said virtual object by enabling modifying said location information of the virtual object.

In another aspect, said means for conditioning interacting are configured to compute at least one supplemental interaction to be attached to the virtual object on the basis of information collected by said means for collecting information.

According to various embodiments, said application platform also comprises means for transmitting to said mobile device a list of at least one supplemental interaction attached to said virtual object that the user of the mobile device may trigger.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION

Based on the foregoing, various exemplary embodiments enable richer interactions with virtual objects.

Figure 8:
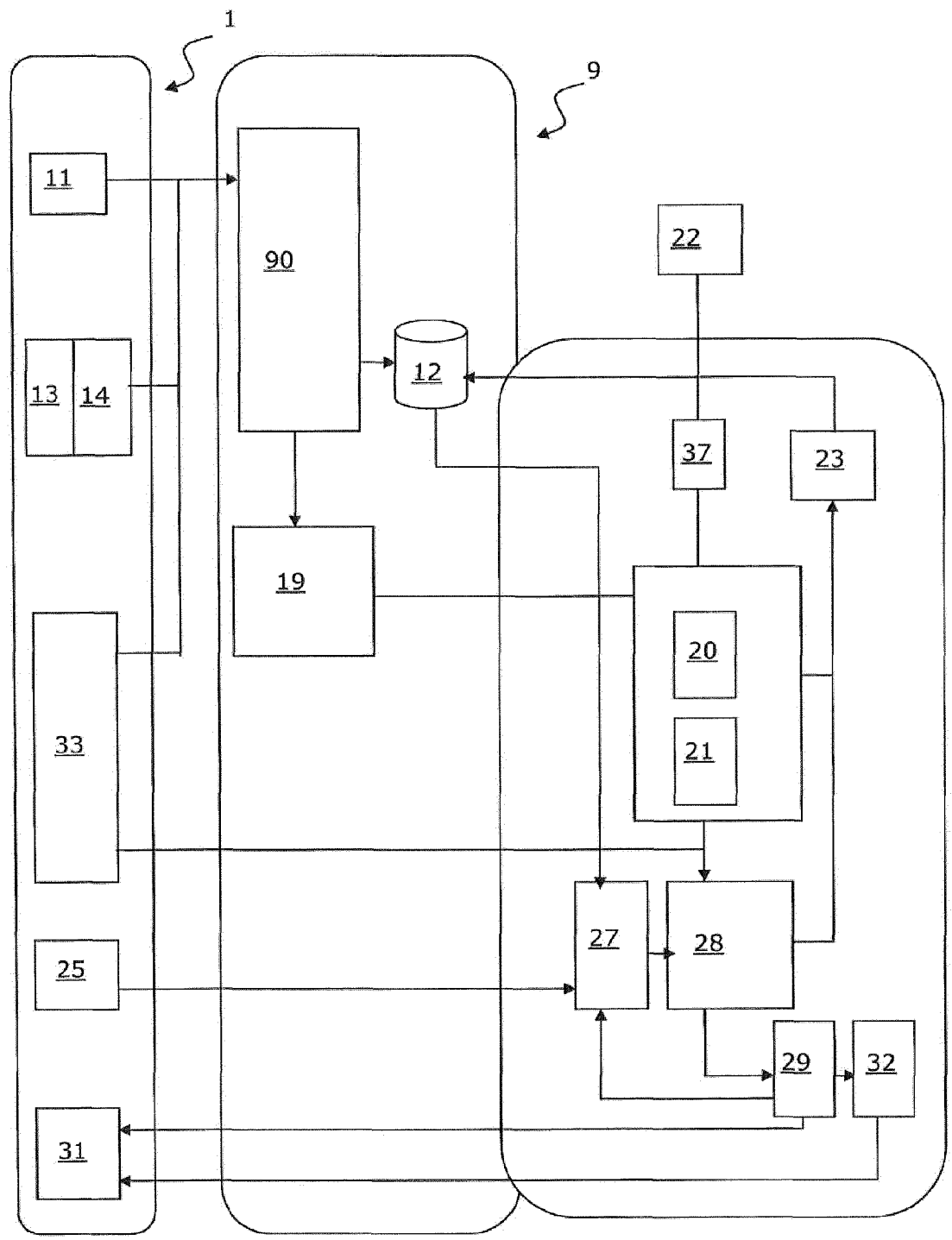
FIG. 8 is a simplified schematic diagram of a system for providing conditional interactions for virtual objects according to various embodiments of the present invention.

Referring to FIG. 8 a system for providing conditional interactions for virtual objects 2 comprises an application platform 9 to compute data relating to virtual objects and a mobile device 1 for accessing said virtual objects. Application platform 9 may comprise a server or group of servers processing and storing data related to virtual objects and to the mobile device 1. As detailed hereafter, application platform 9 is intended to host information related to virtual objects to enable circumstanced interaction with user mobile devices. In particular, information related to virtual objects hosted by the application platform 9 comprise location, possible interactions, and rules for triggering said interactions.

Said mobile device 1 is considered as an end-user platform and may be an electronic portable device such as a smartphone, a PDA, a laptop or any other device capable of communicating with said application platform 9.

For accessing a virtual object 2, said mobile device 1 comprises communications means allowing said mobile device 1 to communicate through a communication network, such as an IP network, with the application platform 9 on which are stored data related to said virtual object.

Said mobile device 1 also comprises a user interface to enable the user interacting with said virtual object when available.

The mobile device 1 is provided with geolocation means for assessing a real-world geographic location P1 to said mobile device 1. Said geolocation means may be specific geolocation means such as a GPS chip or a SIM card used in cooperation with base stations to geolocalise said mobile device 1. Preferably, mobile device 1 includes at least one sensor such as an accelerometer.

In the embodiment illustrated at FIG. 8, the mobile device 1 comprises module 11 for requesting to create a virtual object.

A sensor module 14 enables setting properties of a virtual objet automatically according to the sensor data . . . . An input interface module 13 associated to the mobile device also enables to manually define said properties of said virtual object. Properties of said virtual objet are stored in database 12 of the application platform 9 as explained hereafter.

Subscribing module 25 of the mobile device 1 allows the user to subscribe or not to the conditioned interactions associated with a list of virtual object. In other word said module 25 gives the user the possibility to choose to benefit or not from the interactions available under conditions which are associated with virtual objects.

Mobile device 1 also includes a display module 31 which enables to display to the user available interactions sent by module 32 and/or information to trigger interactions sent by module 29.

Mobile 1 device comprises also a discovering module 33 enabling requesting interaction when predefined condition(s) is (are) satisfied. In various embodiments, said module 33 also allows to transmit a list of virtual objects to the application platform 9 which are analyzed by module 28 of said application platform to define possible interactions on said discovered virtual object or on the virtual object of said list. Discovering module 33 is also configured to communicate with control access module 90.

For instance, with said discovering module 33, the end-user may be at a place looking for objects around. At his initiative, the end-user can request interaction with some of these objects. Request is sent to the module 28 which computes a set of possible interaction according said virtual object and according to the conditions or rules associated to the interactions attached to said virtual object.

The virtual object 2 is provided with a location information P2 corresponding to a real-world geographic location. Said location information may be of different types. A first type, named fixe type, corresponds to a fixe geographical location independent of other objects, i.e. only defined according to the terrestrial frame of reference. A second type, named embedded type, corresponds to a location dependent from the location of said mobile device. A third type, named computed type, corresponds to a location dependent from a computed location of another object or corresponding to a location calculated on the basis of a computed model. Said computed model may be related to physical rules such as gravity. Alternatively, computed model may be a transportation rule of an object (real or virtual), such as a displacement in function of time according to a train trip.

Application platform 9 includes an access control module 90 which is configured to verify if the user connected to said application platform 9 through the mobile device 1 is allowed or not to access other modules of the application platform 9 and in particular to interact with virtual objects and/or to create virtual objects.

Access control module 90 may comprise authentication function with local or remote database storing list of users.

Application platform 9 comprises, as mentioned above, a virtual objects database 12 in which a list of virtual objects and their associated properties are stored.

Application platform 9 also comprises collecting module 19. Collecting module 19 is configured for collecting information related to virtual objects 2 and information related to the mobile device 1. Information related to virtual objects 2 comprises the location information P2 of said virtual object 2. Information related to the mobile device 1 comprises the real-world geographic location P1 of said mobile device 1. Collecting module 19 also enables to collect events, such as move and/or strength and/or direction and/or GPS location, derived from the mobile device 1, and/or to collect other properties of virtual objects stored in the database 12.

In other words, collecting module 19 collects all the necessary information to enable interacting with virtual objects.

Module 27 of the application platform 9 monitors virtual objects for which the user has enabled conditioned interacting through subscribing module 25 included in said mobile device 1.

Application platform 9 also includes computing properties module 20 for computing virtual object properties based on information collected by collecting module 19. According to various embodiments, computing properties module 20 may also takes into input the type of virtual object location and rules, also called adapters, related to the way of computing location of virtual objects. Said rules for computing location may take into input information from physical objects and or environment associated with said virtual object. Said physical information may be stored in external database 22.

Then properties computed by module 20 are set and stored or updated in the virtual objects database 12. Conditioning module 21 sets rules or conditions to be satisfied for triggering the computation of possible interaction associated with virtual objects.

In various embodiments, conditioning module 21 is configured for conditioning interacting with virtual object 2 through said mobile device 1, at least in function of the real-world geographic location P1 of said mobile device 1 and the location information P2 of said virtual object 2.

Module 37 of the application platform 9 comprises computed model, called adapters, provided with dynamic digital information 22, preferably related to real-world information. Module 37 is also provided with the location information P2 of the virtual object 2 to dynamically calculate the location of a virtual object 2 when subjected to said computed model.

Application platform 9 also includes computing interaction module 28. Said module 28 computes a set of possible interactions and their associated rules or conditions to be satisfied to trigger said interactions. When conditions are satisfied at conditioning module 21, module 28 may compute a set of possible interaction with said virtual object 2. Interactions are computed according to the information received from module 20 and/or module 37, and/or module 33 and/or module 27. Rules associated with said computed interaction are computed according to information relative to mobile device(s) and virtual object(s).

According to various embodiments, when ownership is a parameter attached to virtual objects stored in the application platform, said list of possible interactions may comprise:
   the possible interactions of a given end-user on his own virtual objects;
   the possible interactions of said given end-user on the virtual objects of other end-users;
   the possible interactions of said other end-users on said given end-user's virtual objects;
   the possible interactions of both said given end-user's and said other end-user's virtual objects combined.

When conditions defined in the module 21 are satisfied, said module 28 computes a set of possible interactions. Depending of the possible computed interactions, module 28 may automatically change the properties of related virtual objects through changing properties module 23. For instance, said computed possible interactions may comprise warning, changing the virtual object content or color. Alternatively, application platform 9 may transmit though module 32 said set of possible computed interactions to the end-user mobile device to let him decide triggering or not said set of possible interactions.

Optionally, application platform 9 may prompt, through module 29, the end-user mobile device 1 to do something to "unlock" or enrich said possible set of interactions.

When the user performs at least one interaction of the set he received, said interaction is translated into properties changes of all concerned virtual objects by the application platform 9.

As illustrated hereafter, in various embodiments, interacting with virtual object 2 includes modifying the location information P2 of the virtual object 2.

Computing interaction module 28 may compute supplemental interactions 8 to be attached to the virtual object 2 on the basis of collected information received from collecting module 19, in cooperation with module 20 which defines conditions or rules to be satisfied for triggering said at least one supplemental interaction 8 attached to the virtual object 2. Said conditions may comprise verifying that the type of location attached with the virtual object 2 is compatible with said at least one supplemental interaction 8.

Interaction 8 attached with the virtual object 2 may change under at least one condition such as time.

According to various embodiments, the system described above may be used for executing a method for providing conditional interactions for a virtual object 2 accessible with a mobile device 1.

Figure 6:
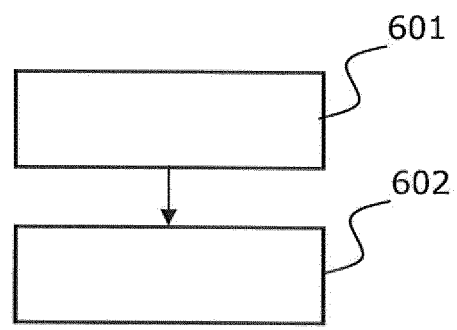
FIG. 6 is a flow chart precising steps executed for interacting with a virtual object according to an embodiment of the invention.

Referring to FIG. 6, at step 601, the application platform 9, which stores virtual objects data, analyzes the real-world geographic location P1 of said mobile device 1 and the location information P2 of said virtual object 2 to check if said locations satisfy predefined conditions. For instance, position P2 may be compared to position P1 to determine if position P2 is in a predefined distance range relative to position P1. Alternatively, positions P1 and P2 may be analyzed to verify if they are commonly included in a predefined area.

At step 602, in case said conditioning step is satisfied, user can interact with said mobile device 1 by modifying said location information P2 of the virtual object 2.

In various embodiments modifying with said mobile device 1 said location information P2 of the virtual object 2, comprises making said location information of said virtual object 2 dependent of information associated with another object.

Figure 1:
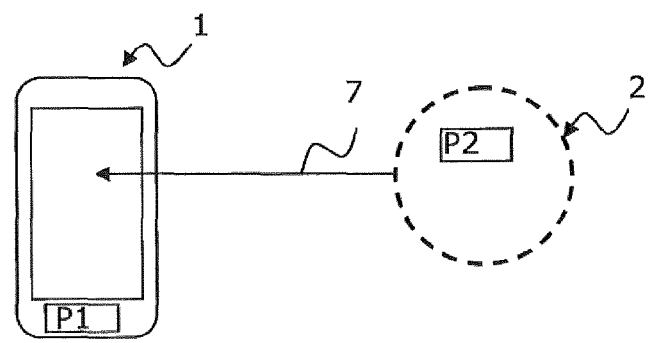
FIG. 1 is a simplified schematic view of a mobile device interacting with a virtual object according to an embodiment of the present invention.

FIG. 1 refers to an embodiment, wherein said another object is said mobile device 1 and wherein said location information P2 of the virtual object 2 is made dependent of the location P1 of said mobile device 1.

For example, the user of the mobile device which is in a predefined area relative to the virtual object 2, is notified by the application platform that interaction 7 with said virtual object is possible. In particular the user may be notified that he has the possibility of "taking" said virtual object.

When "taking" the virtual object, location information P2 of the virtual object is modified by being attached to the one P1 of the mobile device 1. The type of location is thus changed from "fixe" to "embedded". The user then moves to another place with its mobile device 1 and may "drop" the virtual object. When "dropping" the virtual object 2, location information of said virtual object is modified again by attaching it to a fixe real word geographic location. The type of location is changed again from "embedded" to "fixe".

Figure 2:
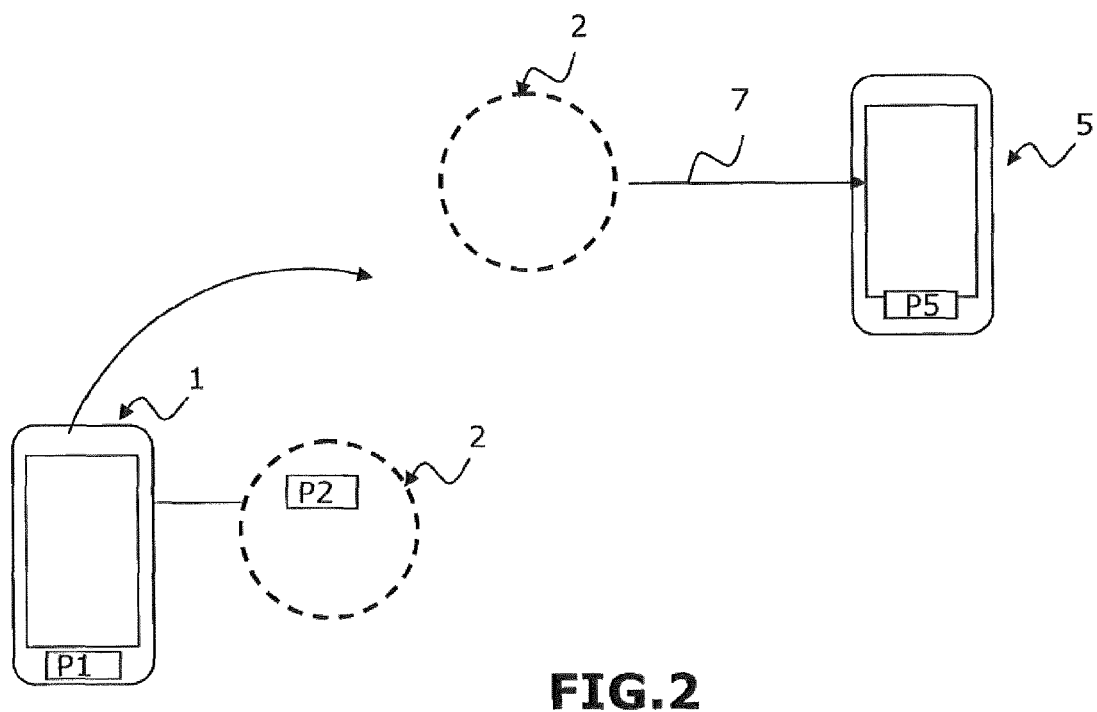
FIG. 2 is a simplified schematic view of two mobile devices interacting successively with a virtual object according to another embodiment of the present invention.

FIG. 2 refers to another embodiment, wherein the location information P2 of the virtual object 2 is made dependent of the location P5 of another mobile device 5 provided with geolocation means. In this embodiment, the mobile device 1 is provided with an acceleration sensor.

Figure 7:
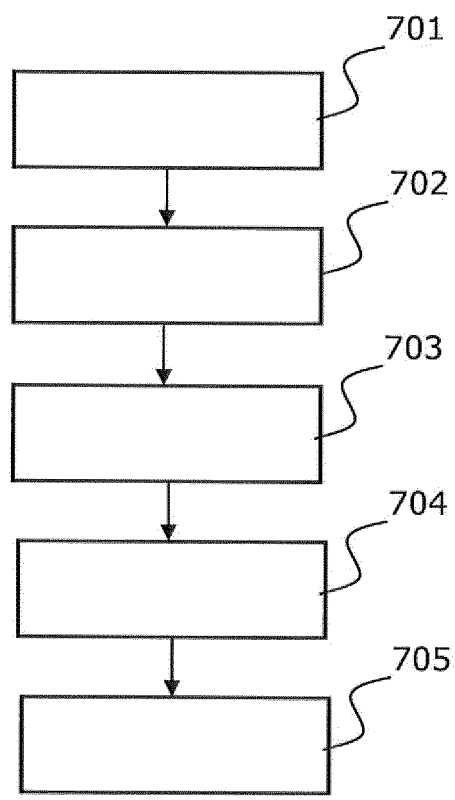
FIG. 7 is a flow chart precising step executed for modifying location information of the virtual object according to the embodiment illustrated at FIG. 1.

FIG. 7 is a flow chart illustrating the step executed for modifying location information P2 of the virtual object 2 according to the embodiment illustrated at FIG. 1. At step 701, the location P2 of the virtual object 2 is attached to the one P1 of the mobile device 1. Next, at step 702, the user applies to the mobile device 1 an accelerated movement. Acceleration is measured with the acceleration sensor at step 703.

At step 704, a new location is calculated for the virtual object 2 in function of said measured acceleration. Finally, at step 705 location information of said virtual object 2 is made dependent 7 from an object which is selected according to the new calculated location of said virtual object 2 and the location of said another object. For instance, said another object selected may be said another mobile device 5 whose distance from the new calculated position of the virtual object is inferior to a predefined value. As a result, mobile devices 1 and 5 have interacted with said virtual object respectively by "launching" and "receiving" said virtual object 2.

Figure 3:
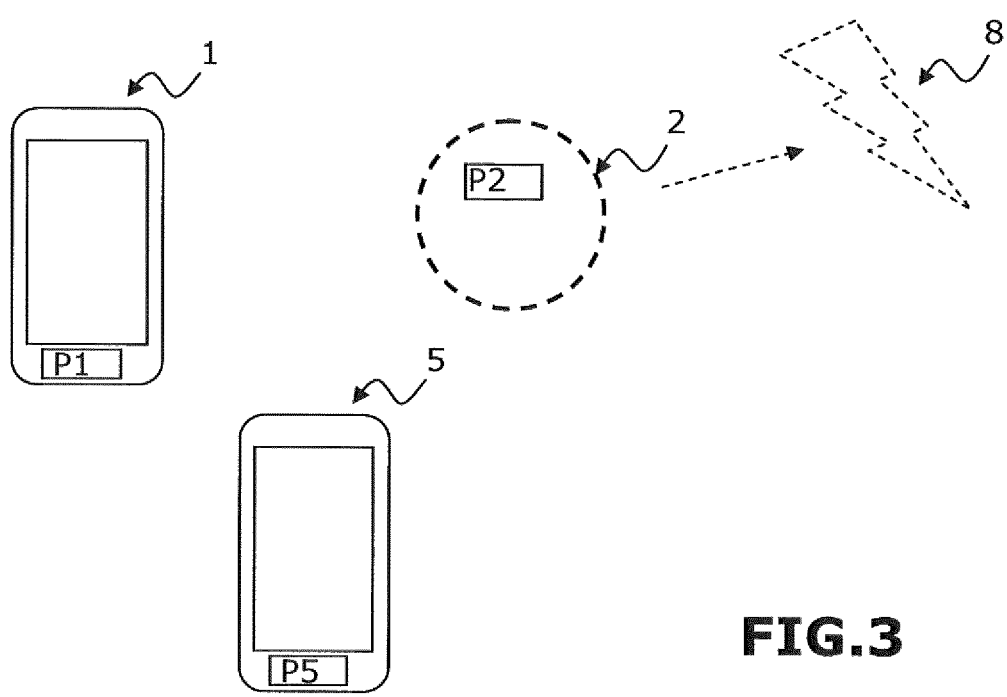
FIG. 3 is a simplified schematic view of a mobile device interacting with two virtual objects according to another embodiment of the present invention.

FIG. 3 refers to another embodiment, wherein one condition for triggering a predefined interaction 8 related to a virtual object 2 is that at least one another mobile device 5 is present in a common geographical area. For instance, triggering an interaction attached with said virtual object 2 may be conditioned to a minimum predefined number of subscriber user mobile devices being present in the vicinity of the virtual object. Other condition may be that these users be considered by the application platform as owner of the virtual object. The owner status may be defined as a property associated with a virtual object.

Figure 4:
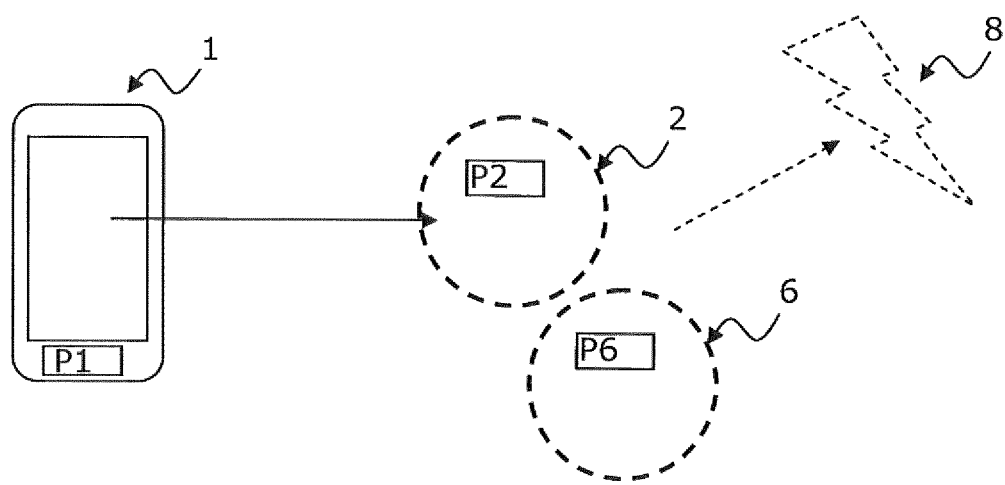
FIG. 4 is a simplified schematic view of two mobile devices interacting simultaneously with a virtual object according to another embodiment of the present invention.

FIG. 4 refers to another embodiment, wherein one condition for triggering said at least one supplemental interaction 8 is that at least one another virtual object 6, assessed with a location information P6, is present with said virtual object 2 in a common geographical area. Thus, triggering an interaction attached with a virtual object may be conditioned to the presence of another specific virtual object. For instance, the possible interaction of cutting wood may implies the simultaneous presence or union of a saw and wood in a common area.

Figure 5:
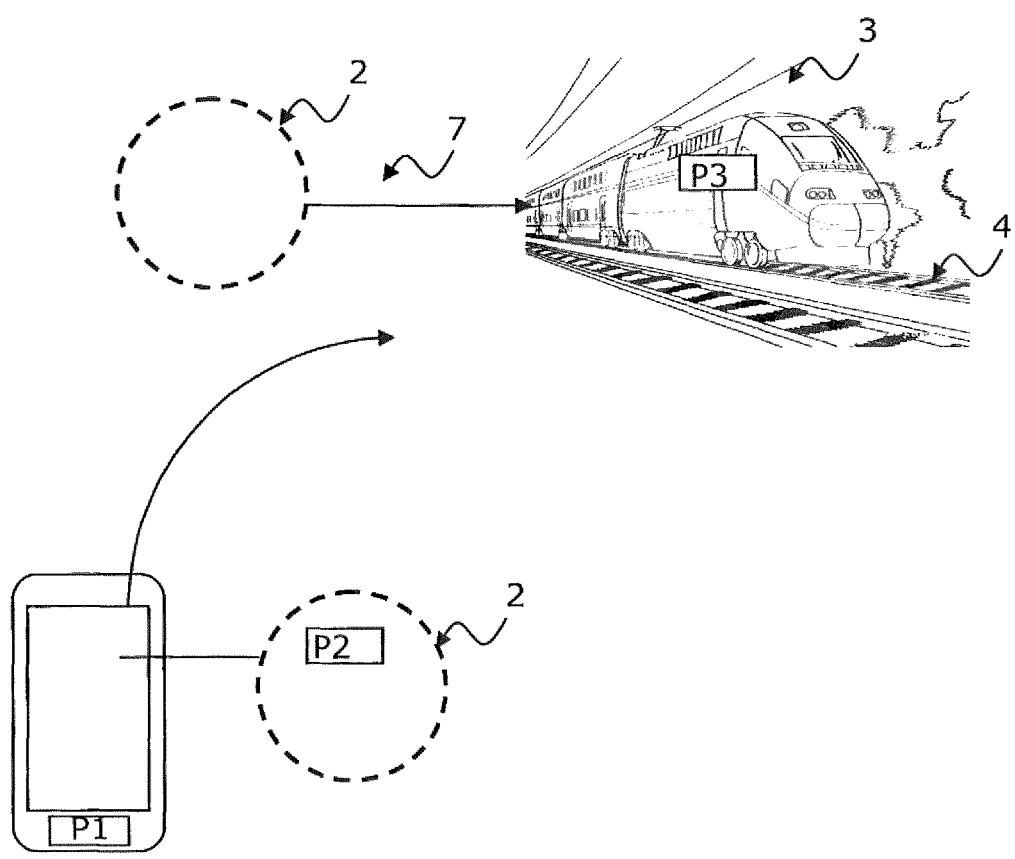
FIG. 5 is a simplified schematic view of a mobile device interacting with a virtual object to make him dependent from another object according to another embodiment of the present invention.

FIG. 5 refers to another embodiment, wherein said another object is another virtual or real object 3 and wherein said location information of the virtual or real object 2 is made dependent of the location P3 of said other virtual or real object 3. Location of said virtual object 2 then corresponds to the location of the other object 3 to which it is attached. location of said another object may be provided by GPS or computed data associated to said object that enables, for example by simulating its displacement, to calculate the location of said object.

For instance, referring to the embodiment of FIG. 5, a user may use its mobile device to "take" a virtual object as explained in reference with the embodiment of FIG. 1 and throw it away as described in reference with the embodiment of FIG. 2, but in direction of a railway 4. The application platform 9, in particular module 20, then computes the new position of the virtual object 2 according to the acceleration measured. Application platform 9, in particular module 21, may condition attachment of the virtual object 2 to the train 3 circulating through the railway 4, to the distance between the new calculated location of said virtual object 2 and the position P4 of the railway 4. If virtual object 2 has been thrown near the railway 4, application platform 9 and in particular module 20 may change properties of said virtual object 2 to make its location dependent from a computed model corresponding to the mobility of a train travelling along said railway 4. IN this case the type of location of virtual object 2 is changed to "computed".

Said computed model may be executed by module 37, with input of external information, stored in external data base 22, related to national railway company of trains, and with few GPS positions of the train at the beginning and during the regular travel to estimate train average speed to locate the virtual object 2. Such information are used by the computed model to dynamically calculate the location of the virtual object 2 subjected to said computed model. As a result, the position of the virtual object 2 corresponds to the one P3 of the train 3 as if said virtual object had been "thrown" or "laid" into the train.

Thus, in various embodiments, once created or updated with their associated properties, the virtual objects may move with their owner, or alone, or on physical objects (like train), or may remain static.

Optionally, a supplemental condition for triggering an interaction may be that said interaction be compatible with a predefined physical computed mobility model. For instance, suppose a virtual object is associated with the dynamic position of a train moving following the dynamic model associated to the train. Also suppose that another train goes in the opposite direction and contains a mobile device susceptible to "take" the virtual object. The operation of "taking" said virtual objet may be conditioned to a physical computed mobility model which defines a minimal time during which said mobile device and said virtual object have to be close to trigger the "taking" interaction. In this case, even though said mobile device and said virtual object will be very close when crossing, this will be very short in time, and considering the physical real world laws used to define said physical computed mobility model, said minimal time will not be respected and will prevent the virtual object to be taken by the mobile device.

The described above technology can be implemented as an application enabler on an application or service platform, or a standalone software service.

Various embodiments of the invention provide dynamic interaction control as a generic program. Application and service developers can focus on the core of their application since all the basic, dynamic and circumstanced interaction control management is performed by various embodiments of invention.

A person skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital storage media. The embodiments are also intended to cover computers programmed to perform said steps of methods described herein.

Although multiple embodiments of the present invention have been illustrated in the accompanying Drawings and described in the foregoing Detailed Description, it should be understood that the present invention is not limited to the disclosed embodiments, but is capable of numerous API rearrangements, modifications and substitutions without departing from the invention as set forth and defined by the following claims.

The invention claimed is:

1. A method for providing conditional interactions for a virtual object accessible with a mobile device, said mobile device comprising a geolocation component configured to assess a real-world geographic location to said mobile device, and said virtual object being assessed a location information corresponding to a real-world geographic location, said method comprising:
conditioning at least one interaction with said virtual object through said mobile device, at least in function of the real-world geographic location of said mobile device and said location information of said virtual object;
in case said conditioning step is satisfied, interacting with said mobile device on said virtual object by modifying said location information of the virtual object.

2. The method of claim 1, wherein modifying with said mobile device said location information of the virtual object comprises making said location information of said virtual object dependent of information associated with another object.

3. The method of claim 2, wherein said another object is said mobile device and wherein said location information of the virtual object is made dependent of the location of said mobile device.

4. The method of claim 2, wherein said another object is another mobile device provided with a respective geolocation component and wherein said location information of the virtual object is made dependent of the location of said another mobile device.

5. The method of claim 2, wherein said another object is another virtual or real object and wherein said location information of the virtual or real object is made dependent of the location of said other virtual or real object.

6. The method of claim 2, wherein said another object is a computed model provided with dynamic digital information, preferably related to real-world information, and also provided with the location information of the virtual object to dynamically calculate the location of the virtual object subjected to said computed model.

7. The method of claim 6, wherein said dynamic digital information comprises real-world information.

8. The method of claim 1, wherein the virtual object is provided with at least one supplemental interaction attached with said virtual object, and at least one condition for triggering said at least one supplemental interaction.

9. The method of claim 8, wherein said at least one supplemental interaction attached with the virtual object changes under at least one condition.

10. The method of claim 8, wherein said at least one condition for triggering said at least one supplemental interaction is that at least one another mobile device is present in a common geographical area.

11. The method of claim 10, wherein said virtual object is provided with a type of location selected between three types of location:
a first type, named fixed type, corresponding to a fixed geographical location independent of other objects;
a second type, named embedded type, corresponding to a location dependent from the location of said mobile device,
a third type, named computed type, corresponding to a location dependent from a computed location of another object or corresponding to a location calculated on the basis of a computed model;

and wherein said at least one condition for triggering said at least one supplemental interaction attached to the virtual object, comprises verifying that the type of location attached with the virtual object is compatible with said at least one supplemental interaction.

12. The method of claim 8, wherein said at least one condition for triggering said at least one supplemental interaction is that at least one another virtual object, assessed with a location information, is present with said virtual object in a common geographical area.

13. The method of claim 8, wherein said at least one supplemental interaction attached with the virtual object changes under at least one condition, wherein at least one condition of the at least one condition comprises a condition based on time.

14. The method of claim 2, wherein said mobile device is provided with an acceleration sensor and wherein modifying said location information of the virtual object, comprises:
    attaching the location of the virtual object to the one of the mobile device;
    applying to the mobile device an accelerated movement;
    measuring said acceleration with said acceleration sensor;
    calculating a new location for the virtual object in function of said measured acceleration;
        and wherein said another object, for which the location information of said virtual object is made dependent from, is selected according to the new calculated location of said virtual object and the location of said another object.

15. A system for providing conditional interactions for a virtual object accessible with a mobile device provided with a geolocation component configured to assess a real-world geographic location to said mobile device, said virtual object being assessed a location information corresponding to a real-world geographic location:
    said system including an application platform which comprises:
    at least one processor configured to:
    collect and compute information related to said virtual object which comprise at least the location information of said virtual object, and information related to the mobile device which comprise at least the real-world geographic location of said mobile device;
    condition interacting with said virtual object through said mobile device, at least in function of the real-world geographic location of said mobile device and the location information of said virtual object; and
    interact with said virtual object by enabling modifying said location information of the virtual object.

16. The system of claim 15, wherein said at least one processor is configured to compute at least one supplemental interaction to be attached to the virtual object on the basis of information collected.

17. The system of claim 15, wherein said application platform also comprises a transmitter configured to transmit to said mobile device a list of at least one supplemental interaction attached to said virtual object that the user of the mobile device may trigger.

\* \* \* \* \*